(12) United States Patent
Kang

(10) Patent No.: US 7,423,557 B2
(45) Date of Patent: Sep. 9, 2008

(54) KEY INPUT DEVICE COMBINED WITH KEY DISPLAY UNIT AND DIGITAL APPLIANCE HAVING THE SAME

(75) Inventor: Sang-woo Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 72 days.

(21) Appl. No.: 11/347,233

(22) Filed: Feb. 6, 2006

(65) Prior Publication Data

US 2006/0179088 A1 Aug. 10, 2006

(30) Foreign Application Priority Data

Feb. 4, 2005 (KR) ...................... 10-2005-0010595

(51) Int. Cl.
*H03M 11/00* (2006.01)
(52) U.S. Cl. ..................... 341/23; 345/170; 341/20; 379/433.04; 379/433.07
(58) Field of Classification Search .................. 341/20, 341/22, 23; 345/170; 379/433.04, 433.07
See application file for complete search history.

(56) References Cited

U.S. PATENT DOCUMENTS 5,818,361 A * 10/1998 Acevedo ...................... 341/23
6,004,049 A 12/1999 Knox
6,332,024 B1 12/2001 Inoue et al.
6,798,359 B1 * 9/2004 Ivancic ........................ 341/23
2003/0132915 A1 7/2003 Mitchell

FOREIGN PATENT DOCUMENTS

| CN | 1443115 A | 9/2003 |
|---|---|---|
| CN | 1575486 | 2/2005 |
| JP | 2002-533840 A | 10/2002 |
| JP | 2003-303526 A | 10/2003 |
| KP | 96-38570 | 11/1996 |
| KR | 10-1996-0024839 A | 7/1996 |
| KR | 10-2004-0059496 A | 7/2004 |
| WO | 01/75580 | 10/2001 |
| WO | 03/019519 | 3/2003 |
| WO | 03/021922 | 3/2003 |
| WO | 2004/059955 | 7/2004 |

* cited by examiner

*Primary Examiner*—Albert K. Wong
(74) *Attorney, Agent, or Firm*—Sughrue Mion, PLLC

(57) ABSTRACT

A key input device combined with a key display unit and a digital appliance having the same are disclosed. The key input device includes a key display unit for displaying a character or an image that identifies a key, a touch sensing unit that moves down and up by a pressure applied to this key, and a signal generation unit for generating an electric signal in accordance with the pressure applied to the key, wherein the character or the image displayed on the key display unit can be changed.

22 Claims, 15 Drawing Sheets

(a) In the Case of Using Telephone Directory (b) In the Case of Using SMS function

KEY INPUT DEVICE COMBINED WITH KEY DISPLAY UNIT AND DIGITAL APPLIANCE HAVING THE SAME

CROSS-REFERENCE TO RELATED APPLICATIONS

This application claims priority from Korean Patent Application No. 10-2005-0010595 filed on Feb. 4, 2005 in the Korean Intellectual Property Office, the disclosure of which is incorporated herein by reference in its entirety.

BACKGROUND OF THE INVENTION

1. Field of the Invention

Apparatuses and methods consistent with the present invention relate to a key input device combined with a key display unit and a digital appliance having the same.

2. Description of the Prior Art

A keypad is an important input device in digital appliances. In order to efficiently provide functions of digital appliances such as mobile phones, remote controllers, personal digital assistants (PDAs), handheld personal computers (HPCs), and notebook computers, the configuration of the keypad and how to position keys on the keypad have been studied in terms of ergonomics.

Although input of specified functions has been considered in terms of ergonomics, the position of the keypad, functional keys and images have not allowed for optimal arrangement. For example, a keypad designed for a right-handed person may not be useful for a left-handed person. Further, a keypad designed to orient a character input may not be useful for cases where numerals or special characters are frequently inputted.

FIG. 1 is an exemplary view of a related art soft key embodied through a display window in which characters representing keys are varied in accordance with functions of the keys.

Korean Patent Unexamined Publication No. 10-2004-59496 discloses a soft key in which functions of some keypads are varied in accordance with specified functions. This soft key provides functions similar to those of the soft key of FIG. 1. A mobile phone 1000 includes display screens 11 and 12 and keypads 110 and 120. The keypad 110 positioned just below the display screen provides a variable key function. The variable key function means that a key has different functions according to selected function modes. For example, FIG. 1a shows the case of using a telephone directory where "Delete", "Select", and "Correct" functions, which are suitable when using the telephone directory, are mapped on keys in the keypad 110. In order to display the functions mapped on the key, the corresponding functions are shown on the display screen 12. FIG. 1b shows the case of using a short messaging system (SMS) function where "Cancel", "Send", and "Recipient" functions, which are required to edit messages to be sent, are mapped on the keys in the keypad 110. In order to display the functions mapped on the keys, the corresponding functions are shown on the display screen 12.

The mobile phone shown in FIG. 1 includes functions provided by some keys and varied in accordance with a selected application, and uses one small window to show the variable functions when the corresponding applications operate.

In using such a small window, however, since the functions are not directly marked on the keys or buttons, it is difficult for a user to perceive the functions. Further, the key set according to the applications are not changeable, which is inconvenient for a user.

Therefore, an apparatus whereby a user can freely set the functions of keys is required. Further, an apparatus for enabling the user to freely use the keys is required since the user cannot freely represent the character or image to identify the function of a key or the key itself. Accordingly, an apparatus and method capable of displaying the information that is indicative of the function of the corresponding key directly on the key is required.

SUMMARY OF THE INVENTION

Accordingly, the present invention has been made to solve the above-mentioned problems occurring in the prior art, and an aspect of the present invention is to freely change a character or an image being displayed on a key.

Another aspect of the present invention is to diversely select a character or an image being displayed on a key.

Additional advantages, objects, and features of the invention will be set forth in part in the description which follows and in part will become apparent to those having ordinary skill in the art upon examination of the following or may be learned from practice of the invention.

In order to accomplish these objects, there is provided a key input device combined with a key display unit and a digital appliance having the same.

According to a first exemplary embodiment of the present invention, there is provided a key input device combined with a key display unit, the key input device including the key display unit for displaying a character or an image that identifies a key, a touch sensing unit that moves down and up by a pressure applied to the key identified by the key display unit, and a signal generation unit for generating an electric signal in accordance with the pressure applied to the key, wherein the character or the image displayed on the key display unit can be changeable.

According to another exemplary embodiment of the present invention, there is provided a digital appliance having a key input device combined with a key display unit, the digital appliance including the key display unit for displaying a character or an image that identifies a key, a touch sensing unit that moves down and up by a pressure applied to the key identified by the key display unit, a signal generation unit for generating an electric signal in accordance with the pressure applied to the key, and a display control unit for changing the character or the image displayed on the key display unit.

A key or a button activates or inactivates a specified function in the digital appliance. For example, if a key (or a button) "1" is pressed, "1" is displayed on a display unit or a function related to "1" is carried out. In the case of a mobile phone, it can be easily seen that several characters are marked on one key because one key may carry out several different functions according to the circumstances.

A key map includes the character or image to be displayed on the key display unit and information on a code when the corresponding key is depressed. For example, if the character or image to be outputted to the first key button is not the number "1", it means that the key map has the corresponding character or image and information matching the first key button. According to a key input device, the key code may be fixed, and only information indicative of the character or image to be outputted to the key may be included in the key map.

The key map may be created and assigned by a user, or may be set according to the application. The key input device may receive the key map from another apparatus or network according to the function of a digital appliance provided by the key input device. In the case of a mobile phone, for example, the key map may be set in association with a wireless communication network, and in the case of a remote controller, the key map information may be received from other home appliances.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EXEMPLARY EMBODIMENTS OF THE INVENTION

Figure 1:
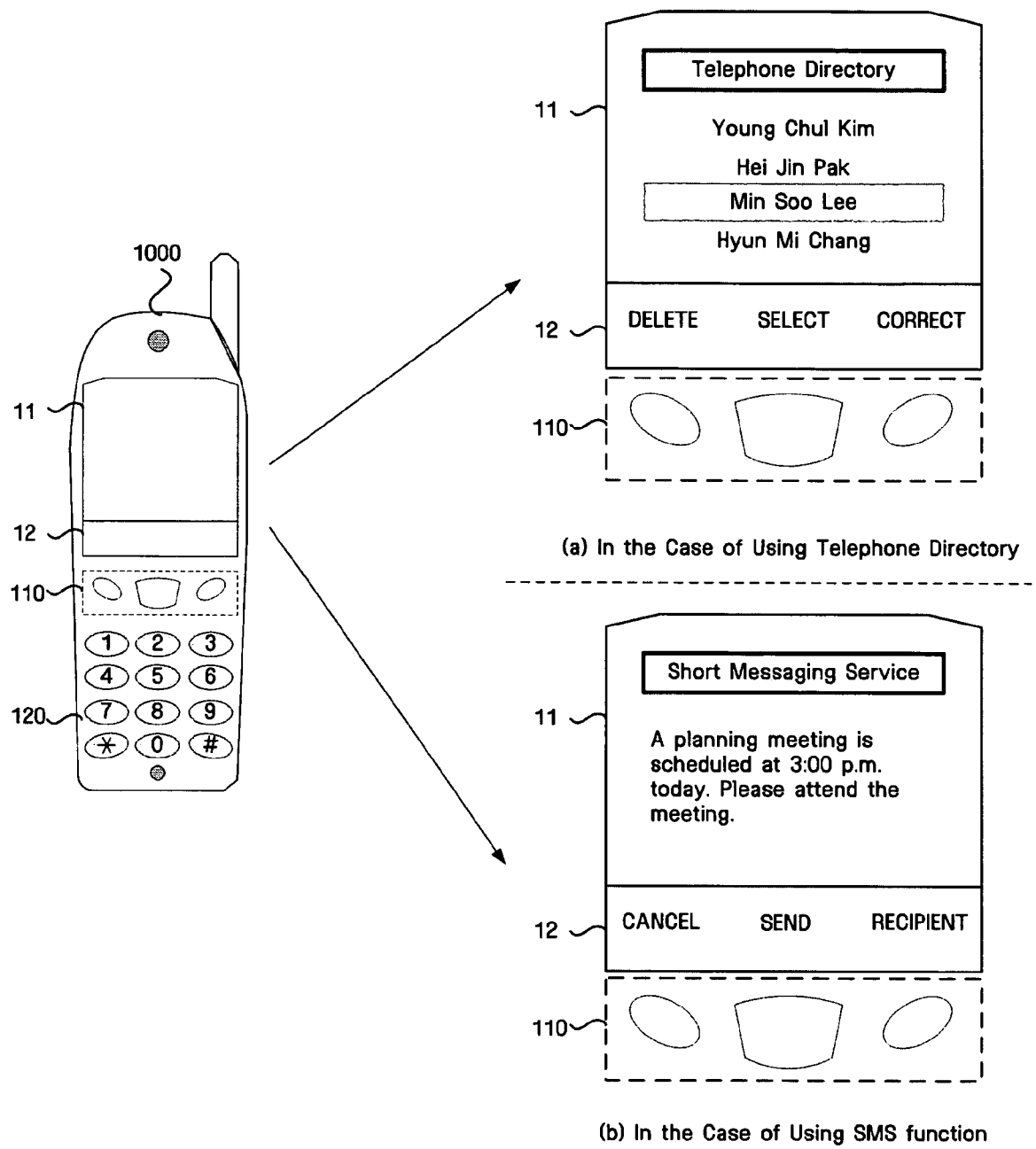
FIG. 1 is an exemplary view of a related art soft key embodied by a display window which changes a character representing a key in accordance with a function of the key according to an exemplary embodiment of the invention.

Hereinafter, exemplary embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Figure 2A:
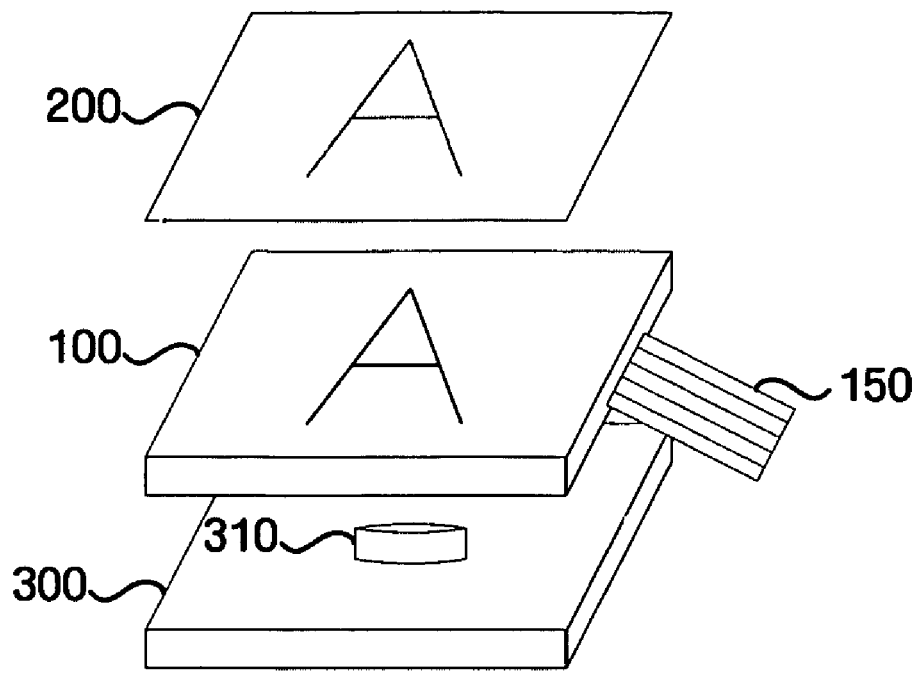
FIGS. 2A, 2B and 2C are views illustrating the construction of a key according to an exemplary embodiment of the present invention.
Figure 2B:
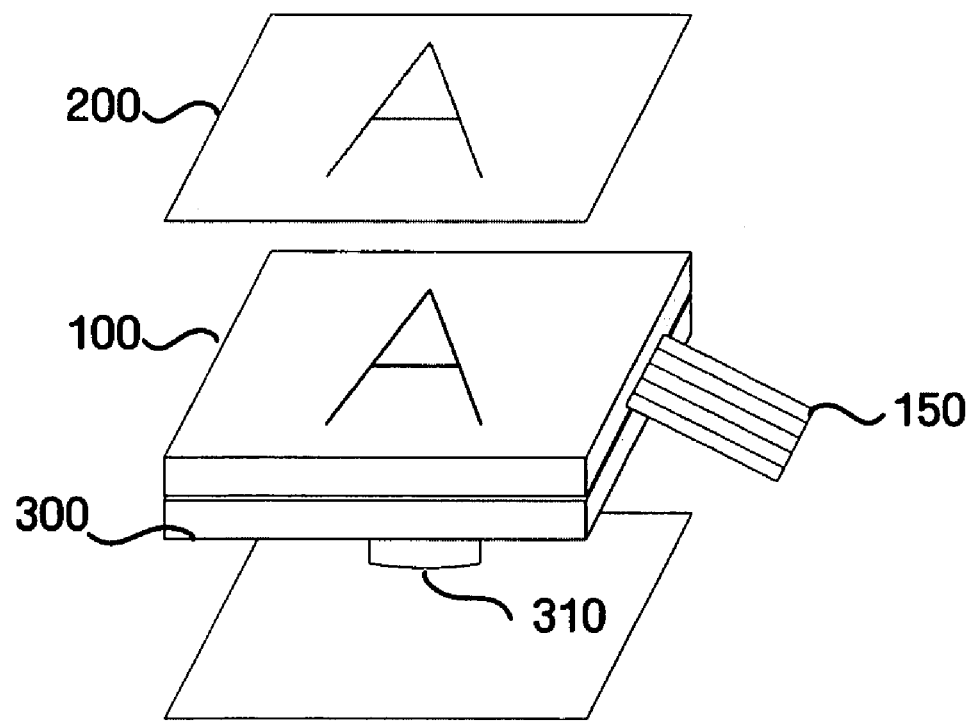
Figure 2C:
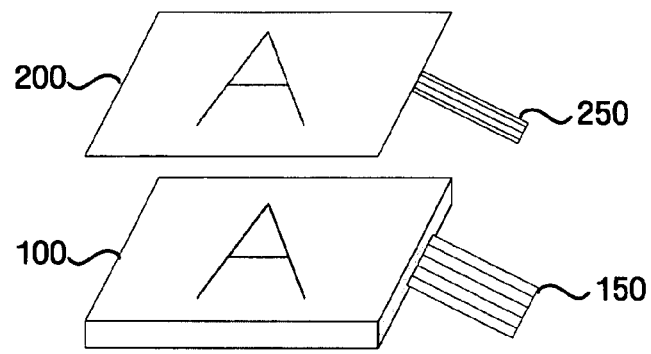

FIGS. 2A, 2B and 2C are views illustrating the construction of a key according to an exemplary embodiment of the present invention.

The function and name of each component commonly shown in FIGS. 2A, 2B and 2C are as follows.

A key display unit 100 displays characters, images, or preset colors. A display device such as an organic electroluminescence (EL) device or a very small display device such as an LCD may be used as the key display unit.

The organic EL device (or organic light emitting diode) is a self-emissive display device that electrically exits a fluorescent organic compound to emit light, and that has advantageously is driven at a low voltage and has a low profile. The organic EL device is considered a next-generation display device, which can solve the drawbacks of the LCD, due to a wide viewing angle and rapid response speed. It is desirable to use an organic EL device in the key display unit 100 due to the advantages of low voltage and a low profile. However, the key display unit 100 is not limited to the organic EL device, but it can include, for example, the keypad used in a mobile phone or PDA, and a display device having a size similar to one key or button.

A connector 150 controls a character or an image, or a color to be displayed on the key display unit 100. The connector 150 may transmit/receive data to display preset information in accordance with the setting of the user or the application of a digital appliance.

A touch sensing unit 300 senses if the key is depressed or how long the key has been depressed. The touch sensing unit 300 may include a signal generation part 310 for generating a signal when the touch sensing unit senses the contact. The signal generation part 310 may be positioned under the touch sensing unit 300, as shown in FIGS. 2A and 2B. When the user depresses the key, the signal generation part 310 generates an electric signal, which indicates that the corresponding key is depressed. Further, the signal generation part 310 is made so that the key is returned to its original position after the key is depressed by the user, which will be described in detail with reference to FIGS. 4A, 4B and 4C.

Pressure is applied to the key display unit 100 when it is directly depressed by the user, and thus the key display unit 100 may not last long. Accordingly, there is a need for a transparent or translucent protector 200 for reducing the pressure applied to the key display unit 100, and protecting the key display unit 100.

As shown in FIG. 2C, a touch sensing function is added to the protector 200. The character or image is displayed through the key display unit 100, and the protector 200 is connected to an upper portion of the key display unit 100. The protector 200 is provided with the touch sensing function. Accordingly, the protector 200 is connected to a connector 250 for reporting the key input when the contact occurs. The example shown in FIG. 2C senses the contact or input on the upper portion of the key display unit 100 to generate the signal, unlike those shown in FIGS. 2A and 2B.

Figure 3A:
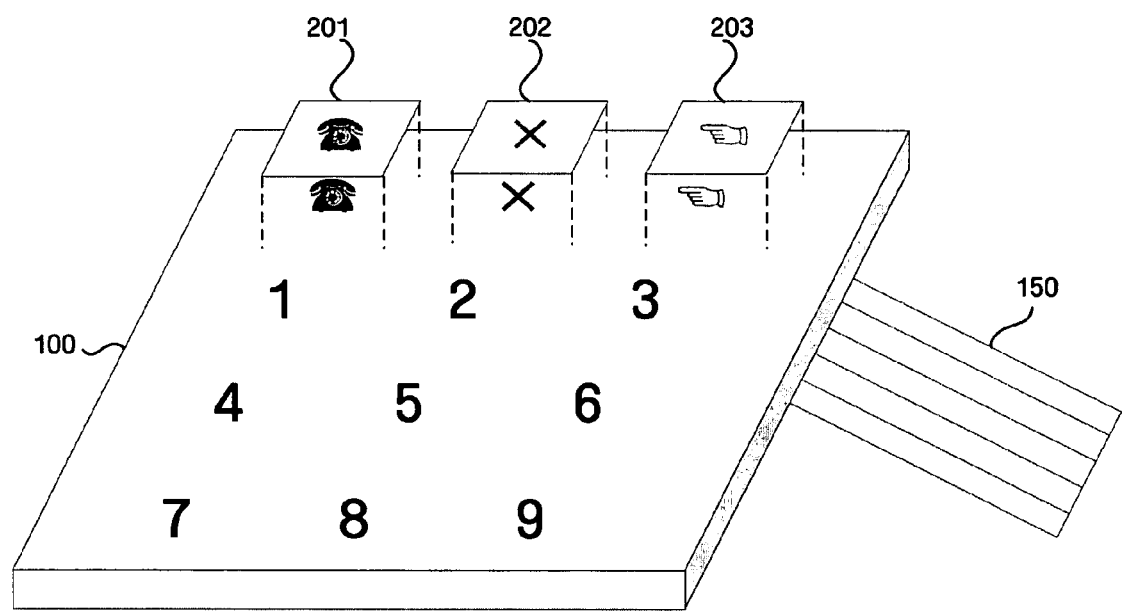
FIGS. 3A, 3B and 3C are views illustrating the construction of a key according to another exemplary embodiment of the present invention.
Figure 3B:
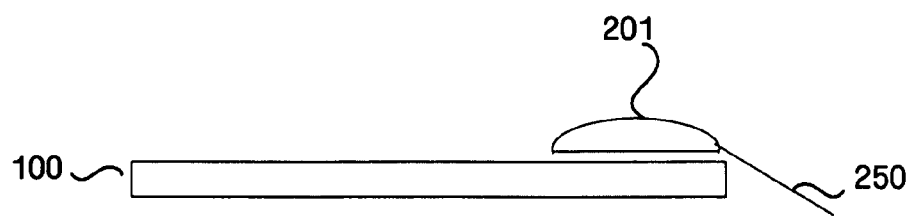
Figure 3C:
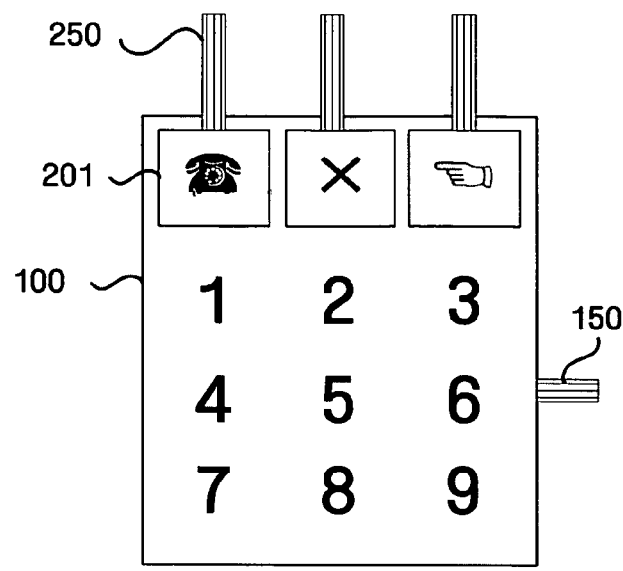

FIGS. 3A, 3B, and 3C are views illustrating the construction of a key according to another exemplary embodiment of the present invention. FIGS. 2A, 2B and 2C show the apparatus where one key display unit for one key displays the character or image. Meanwhile, FIGS. 3A, 3B and 3C show the apparatus where one key display unit for at least two keys outputs images or characters, and each image or character represents one key. A protector for sensing the key depress is arranged on the upper portion of the key display unit.

FIG. 3A is a perspective view, in which diverse characters or images are displayed on one key display unit 100. These characters or images represent the corresponding key individually. However, since the key display unit 100 is not a touch screen, the key display unit 100 does not sense the input. The key display unit is provided on the upper portion thereof with protectors 201, 202 and 203 for sensing the input and for protecting the key display unit 100. A connector 150 sends a signal for displaying character or image to the key display unit, and controls the color or brightness of the key display unit.

FIG. 3B is a side view. As can be seen from the side of the key display unit, the protector 201 representing one key is disposed on the key display unit, and may sense the input or touch of the user. Further, the protector 201 sends the signal through the connector 250 to report the input or touch.

FIG. 3C is a plan view. As can be seen from the top of the key display unit, the key display unit 100 displays the character or image corresponding to the key. The protectors 201, 202 and 203 for sensing the input are placed on the respective characters or images. Since the respective protectors 201, 202 and 203 also have the touch sensing unit, the protector is connected to the connector 250 for sending a signal when it is inputted or touched. As such, the device can know when a key is depressed through the protector and connector.

The above key may be applied to diverse digital appliances such as a mobile phone, a PDA, an HPC, a notebook computer, and a remote controller. In particular, in the case of the mobile phone or PDA, since the key is small and the number of the buttons is small, application of the key combined with the key display unit may meet various demands of the user. The mobile phone may be provided with a service for downloading and storing characters or images such as ring-tone download, which will be described in detail with reference to FIG. 9.

Figure 4A:
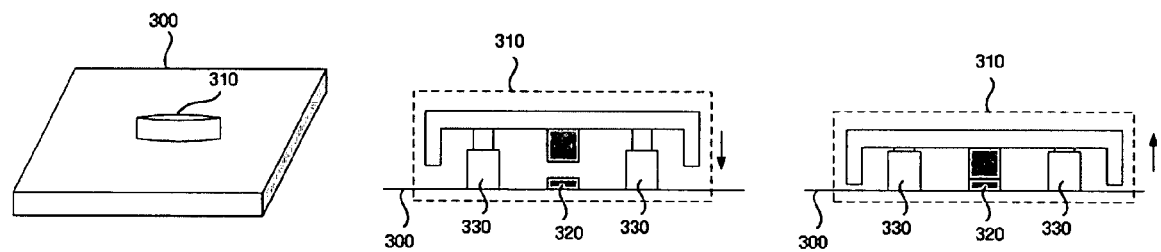
FIGS. 4A, 4B and 4C are views illustrating the construction of a touch sensing unit according to an exemplary embodiment of the present invention.
Figure 4B:
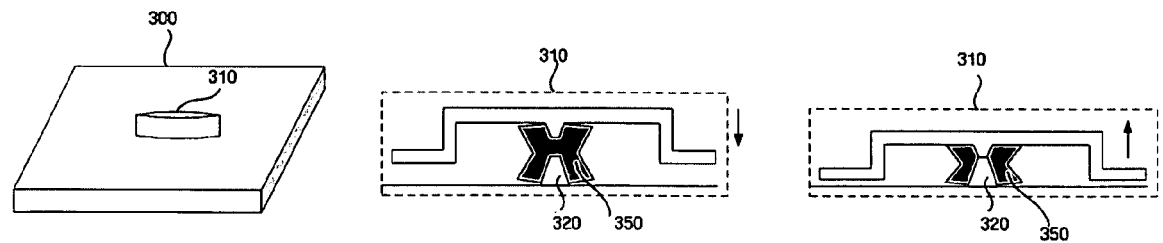
Figure 4C:
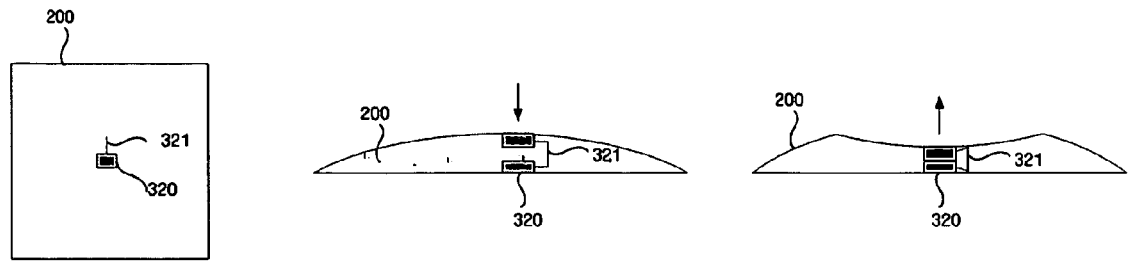

FIGS. 4A, 4B and 4C are views illustrating the construction of the touch sensing unit according to an exemplary embodiment of the present invention.

The touch sensing unit will now be described in detail. If the user depresses the key, the touch sensing unit reports the key depress. Further, the touch sensing unit provides the user with feedback; that is, the user feels the down movement of the key, and hears the operating sound of the key. Therefore, the touch sensing unit may provide minute resiliency.

FIG. 4A shows one example of the touch sensing unit which generates an electric signal when the user depresses the key.

FIG. 4A shows the construction of the touch sensing unit which can be applied to the FIGS. 2A and 2B. The signal generation part 310 includes a support 330 for resiliently supporting the key. The support is made of a resilient member such as a rubber, a spring, or the like. Further, the signal generation part 310 includes a pair of contact portions 320 for generating an electric signal when the key is depressed. When one contact portion 320 contacts the other contact portion 320, the electric signal is inputted or interrupted, which reports the down movement of the corresponding key. Since the support 330 is made of the resilient member, the support 330 provides the key with the resiliency so that after the key is depressed, it is returned to its original position.

FIG. 4B is a view similar to FIG. 4A, except that the key is returned to its original position by a resilient material such as rubber.

FIG. 4C shows that the contact portion 320 is connected to the display protector 200, which can be applied to FIG. 2C or FIGS. 3A, 3B and 3C. Since a pair of contact portions 320 are inserted in the display protector 200, when desired pressure is applied to the display protector 200, one contact portion 320 contacts the other contact portion 320 to generate an electric signal. The key display unit is provided on an upper surface thereof with a transparent material for displaying a character or image outwardly. The contact portions 320 are inserted in the display protector 200 made of transparent vinyl or rubber. The display protector further includes a connection 321 for creating an electric short when the contact portions 320 contact each other. The contact portions 320 are provided in the display protector 200, and the contact portions 320 contact each other in the display protector 200 when the user depresses the display protector 200, thereby generating the electric signal. Further, the connection 321 is returned to its original position after a finger is taken off the display protector, so that the contact portions 320 are detached from each other and are then returned to each other. The electric signal is similar to that of the description of FIG. 4A.

Figure 5:
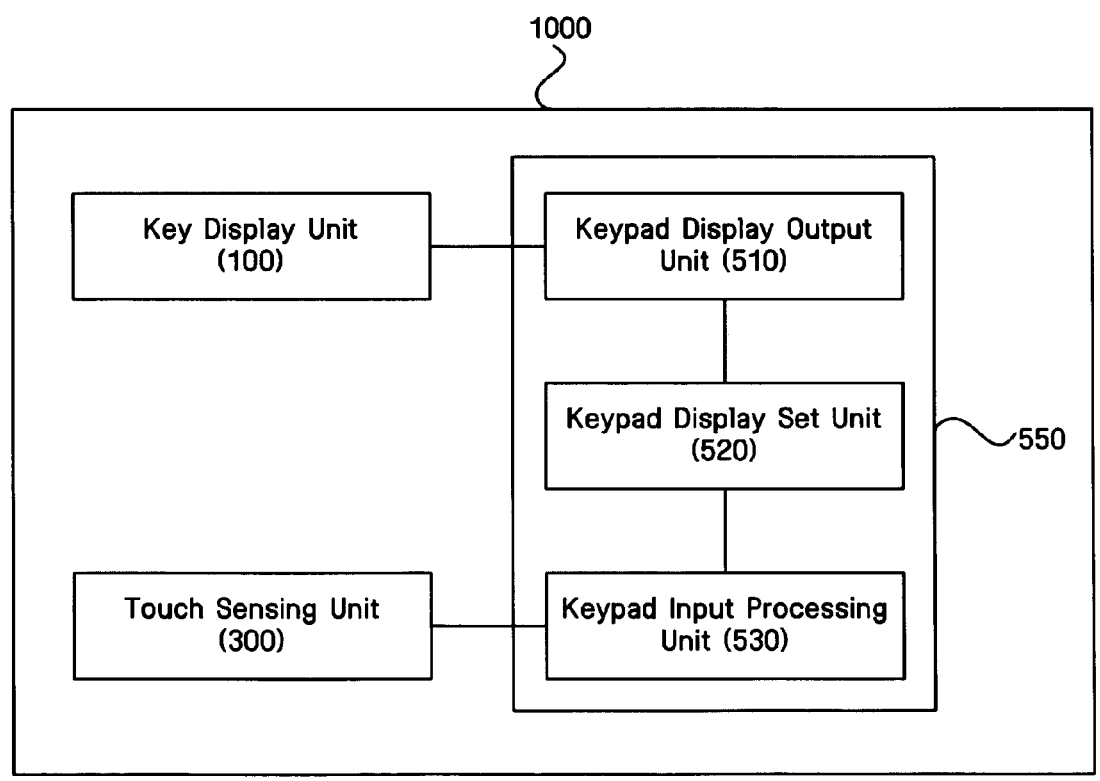
FIG. 5 is a block diagram illustrating an apparatus including a key display unit according to an exemplary embodiment of the present invention.

FIG. 5 is a block diagram illustrating the apparatus including the key display unit according to an exemplary embodiment of the present invention. The term "unit", as used herein, i.e., "module" or "table", means, but is not limited to, a software or hardware component, such as a field programmable gate array (FPGA) or an application specific integrated circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and units or further separated into additional components and modules. In addition, the components and modules may be implemented so as to reproduce one or more CPUs in a device or secure multimedia card.

The key display unit 100 is a device for outputting the character or image capable of identifying the keys as described in FIGS. 2A, 2B, 2C, 3A, 3B, and 3C.

A key display control unit 550 sets and changes the character or image to be displayed on the key display unit 100. The key display control unit 550 includes a keypad display output unit 510, a keypad display set unit 520, and a keypad input processing unit 530.

The keypad display output unit 510 sends the character or image to be outputted to the key display unit 100 as a signal.

The keypad display set unit 520 sets the type of the character or image, the degree of brightness, and the color of the character or image. The keypad display set unit 520 may be freely set by the user to display a desired character or image. Further, the keypad display set unit 520 may display the set character or image according to the currently operating application.

The key display unit 100 may also be cooperating with a pivot function. If the keypad is laterally or vertically turned over or rotated at a right angle by rotating the mobile phone or PDA, the displayed character or image is also rotated. The keypad display set unit 520 controls the character or image via the keypad display output unit 510 according to the input of the user, or via a sensor for sensing the rotation of the keypad. Accordingly, the key display unit 100 can output the rotated character or image.

The touch sensing unit 300 senses the key input of the user. Since the function of the key is set differently according to the application or user, the keypad input processing unit 530 may process the input based on the information on whether the input signal is associated with any function. The information is based on the information set by the keypad display set unit 520.

Figure 6:
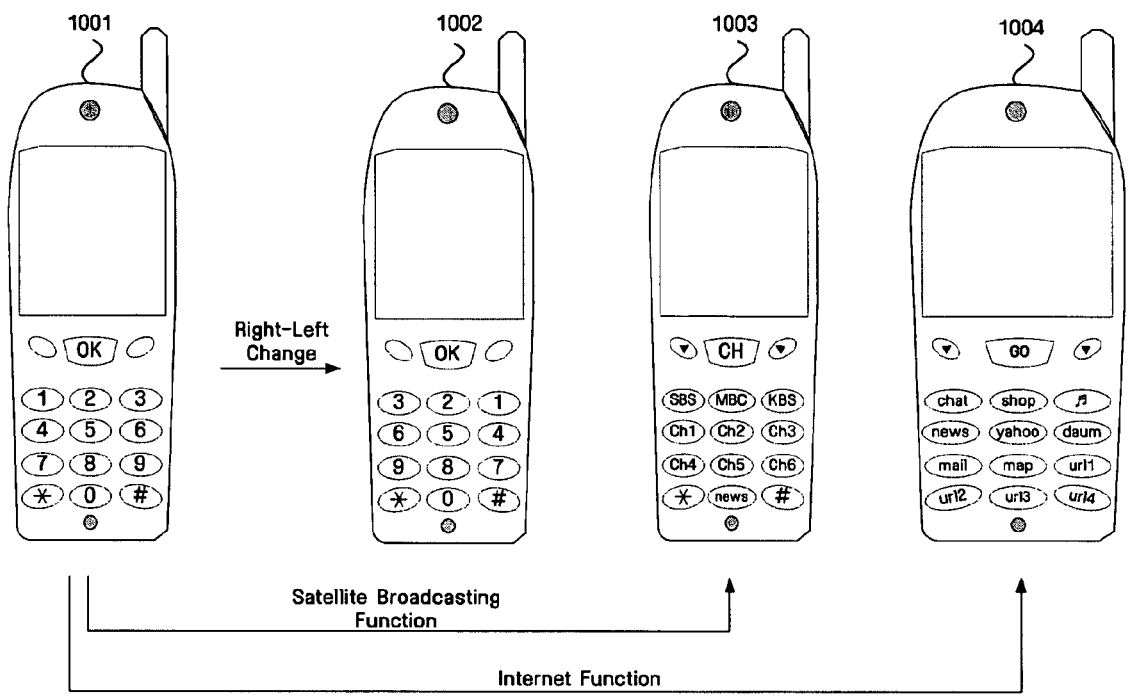
FIG. 6 is a view illustrating the case where a key arrangement of a mobile phone is changed depending upon an application according to an exemplary embodiment of the present invention.

FIG. 6 is a view illustrating the case where a key arrangement of the mobile phone is changed depending upon the application according to an exemplary embodiment of the present invention.

Reference numeral 1001 indicates a mobile phone having a common key. Reference numeral 1002 indicates a mobile phone having a different key arrangement that is suitable for a left-handed person. In this case, it should be noted that the character to be displayed changes depending upon the function provided by each key.

Reference numeral 1003 indicates a mobile phone receiving satellite broadcasts. In the case of receiving the satellite broadcasts, a keypad capable of easily tuning a broadcasting channel is desireable, rather than the enumerated keypad. Accordingly, names of the broadcasting channels are displayed on the keypad. For example, characters such as SBS, MBC, KBS, Ch 1, Ch 2, and others are displaced so as to allow the user to easily select the channel. In order to select a specified channel, a user depresses the key displaying the corresponding channel to tune in the channel.

Reference numeral 1004 indicates a mobile phone using an Internet function. When the mobile phone is connected to the Internet, it is necessary to quickly move between web pages. In the mobile phone 1004, web pages frequently used by the user are displayed on the keys. The user depresses the key to move to a desired web page.

Figure 7:
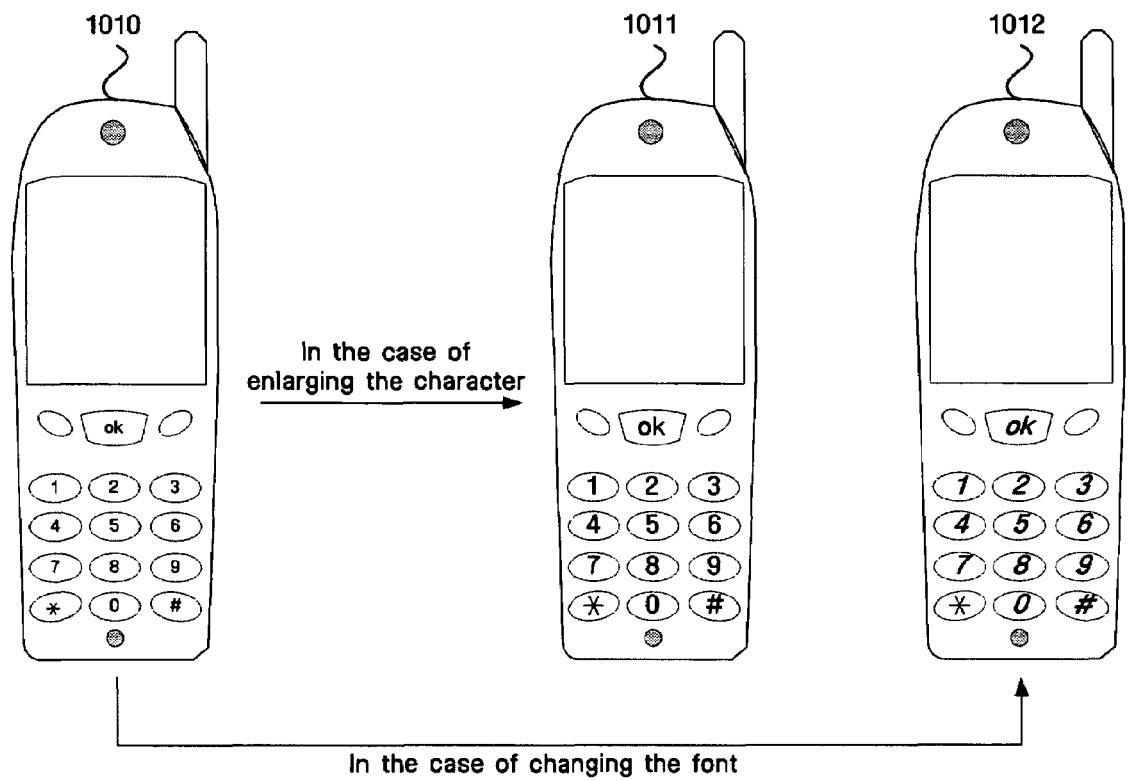
FIG. 7 is a view illustrating the case where a character or image displayed on a keypad is enlarged or a font displayed on a keypad is changed according to an exemplary embodiment of the present invention.

FIG. 7 is a view illustrating the case where a character or image displayed on a keypad is enlarged or a font displayed on a keypad is changed according to an exemplary embodiment of the present invention.

In the case of the mobile phone, the font, size, and color of the character to be outputted on the display screen may be set according to the taste of the user. In the case where characters are printed on the keypad, however, the properties of the characters cannot be changed.

In FIG. 7, the size of the characters each representing the function of the key on the keypad of the mobile phone 1011 is larger than that on the keypad of the mobile phone 1010. The characters or images to be displayed are enlarged so that the user may easily view the keys.

The mobile phone 1012 shows the case where the font of the characters to be displayed is changed according to the taste of the user. The characters may use the fonts built in the digital appliance or another font received via wire or wireless communication.

In addition to the font change, the key display unit 100 may output an image. It may add the user's favorite color to the key, and other applications can change this. Further, the key display unit 100 may output a moving image. The expression "moving image" means that at least two images are changed at a constant time interval. If the image or character displayed on the key is not stationary, but dynamically changes, a satisfying user interface is created.

Figure 8:
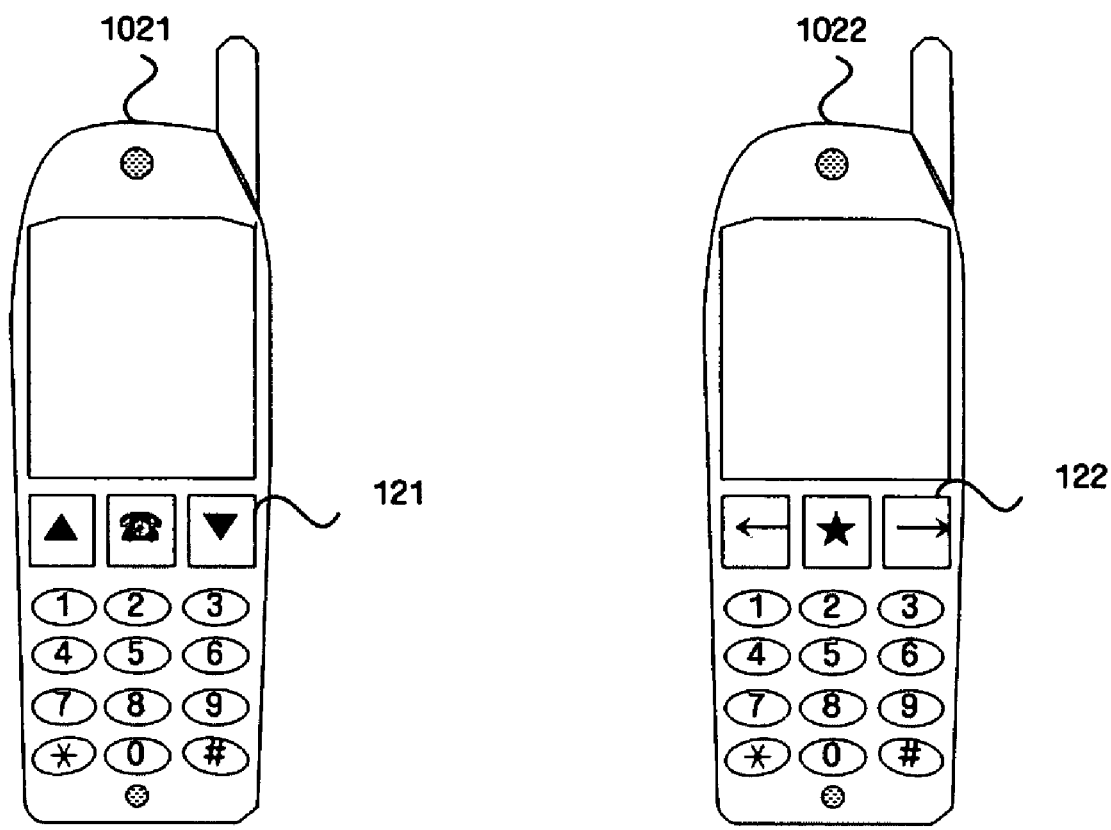
FIG. 8 is a view illustrating a key display unit combined with some keys according to an exemplary embodiment of the present invention.

FIG. 8 is a view illustrating the key display unit combined with some keys according to an exemplary embodiment of the present invention.

It is not necessary to mount the key display unit with all keys. The key display unit may be mounted with only the keys whose function is frequently changed, or keys which are frequently used by the user, thereby outputting the character or image according to the changed function. In mobile phones 1021 and 1022, the key display unit is connected to only three keys positioned on the uppermost portion of the keypad. Accordingly, the characters or images displayed on the three keys 121 and 122 are changed according to the circumstance or the selection of the user. It should be noted that the number keys of mobile phones 1021 and 1022 does not change.

Figure 9:
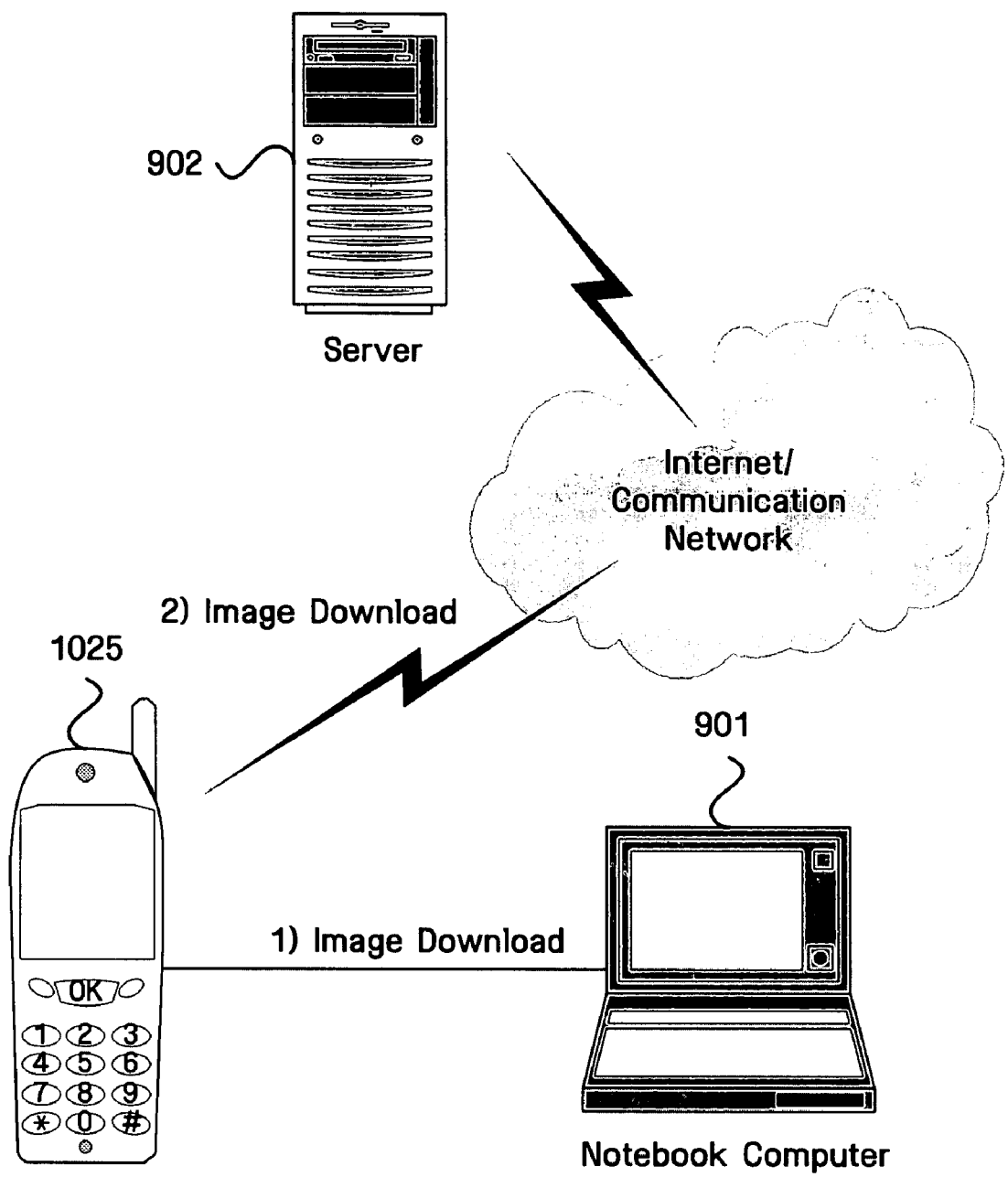
FIG. 9 is a view illustrating a process of receiving a character or image to be displayed on a key from an external source according to an exemplary embodiment of the present invention.

FIG. 9 is a view illustrating a process of receiving the character or image to be displayed on the key from an external source according to an embodiment of the present invention.

The image may be provided in an image file, while the character may be provided in a font file. Accordingly, the image file or font file may be downloaded from an external server 902 through the Internet or a mobile communication service provided by a corporation. Further, an image file or font file directly created by the user may be downloaded from a notebook computer 901 through a USB port. When a mobile phone or PDA downloads a music file or game software after paying a fee, the characters or images to be displayed on the key can also be downloaded.

Figure 10:
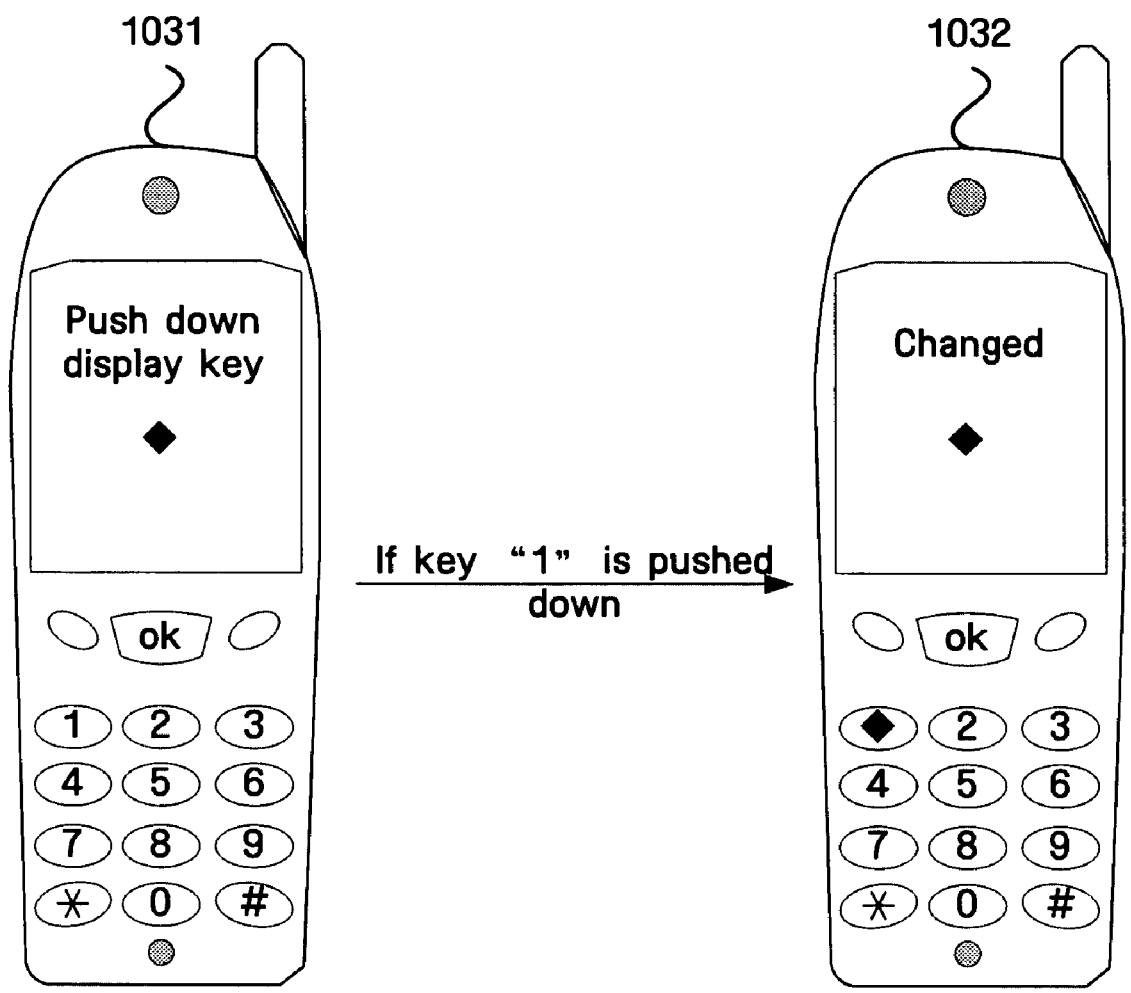
FIG. 10 is a view illustrating a process of setting a character or image to be outputted to a key according to an exemplary embodiment of the present invention.

FIG. 10 is a view illustrating a process of setting the character or image to be outputted to the key according to an exemplary embodiment of the present invention.

The display of a mobile phone 1031 displays a specified image, so that the user can assign a key for the image. If the user depresses the key "1", the key "1" represents the image. With the result that the user selects the key "1", the key display unit displays the image as the mobile phone 1032 shown in FIG. 1032.

Figure 11:
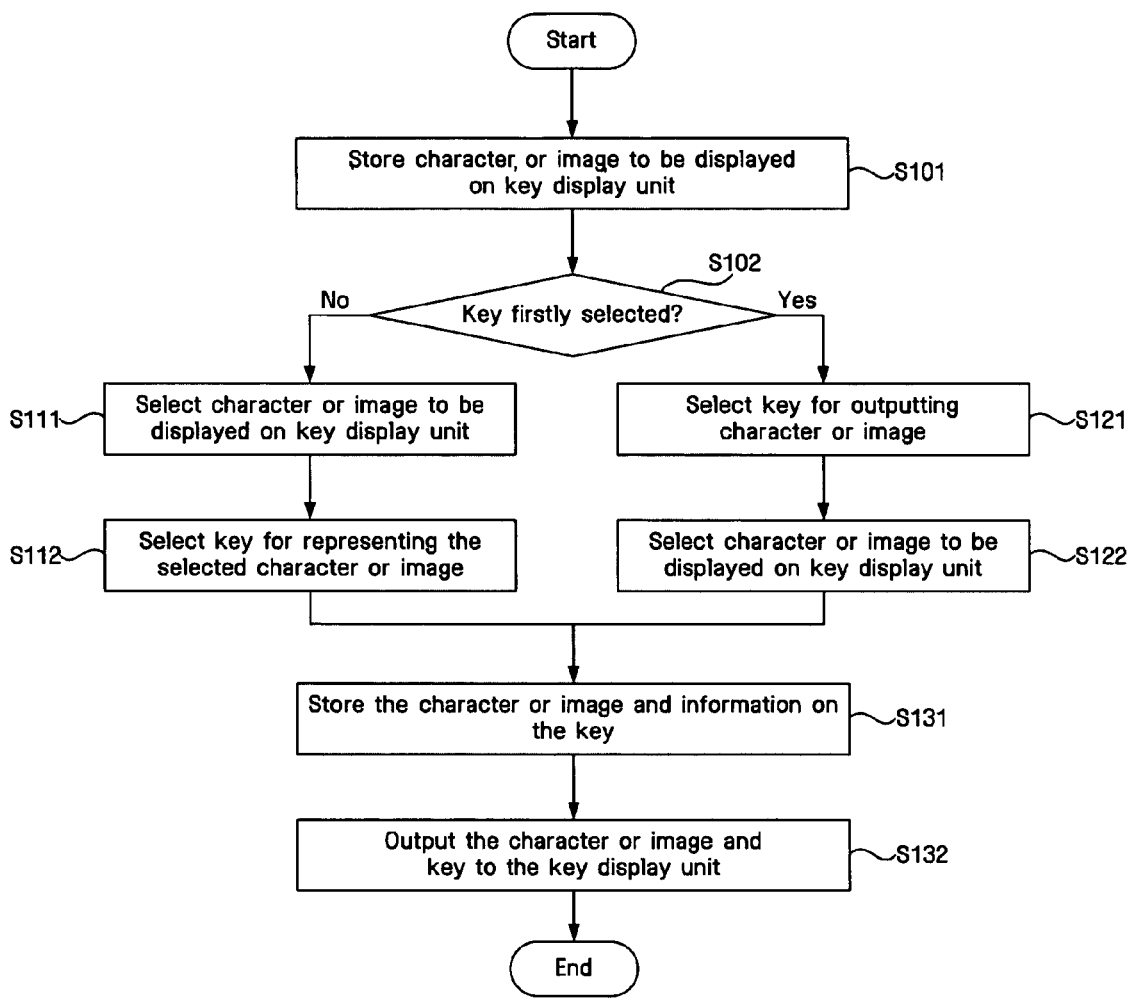
FIG. 11 is a flowchart illustrating a process of setting a character or image to be outputted to a key according to an exemplary embodiment of the present invention.

FIG. 11 is a flowchart illustrating a process of setting the character or image to be outputted to the key according to an exemplary embodiment of the present invention.

As described in FIG. 9, the mobile phone downloads and stores the character or image from the an external source S101. In turn, the process of setting the key is implemented S102. In step S102, it is determined whether the key has been selected first or the image or character has been selected first according to the application of setting the character or image. In the case of selecting the character or image first, the character or image to be displayed on the key display unit is outputted to the display unit of the digital appliance such as a mobile phone. In turn, the user selects the character or image to be displayed on the key display unit S111. Then, the user selects the key for representing the selected character or image S112. The selected image may be displayed by depressing the corresponding key, as in the process shown in FIG. 9.

If the key is selected first in step S102, the user selects the key for outputting the character or image S121. After that, the user selects the character or image to be displayed on the key display unit of the selected key S122.

After the character or image to be displayed and the key are selected, the information on them is stored through the keypad display set unit 520 described in FIG. 5 S131. The selected character or image is outputted to the key display unit of the key selected in step S112 or S121 S132.

When the key display unit displays several keys, as shown in FIG. 3A, the selected character or image is outputted to the position corresponding to the corresponding key.

Figure 12:
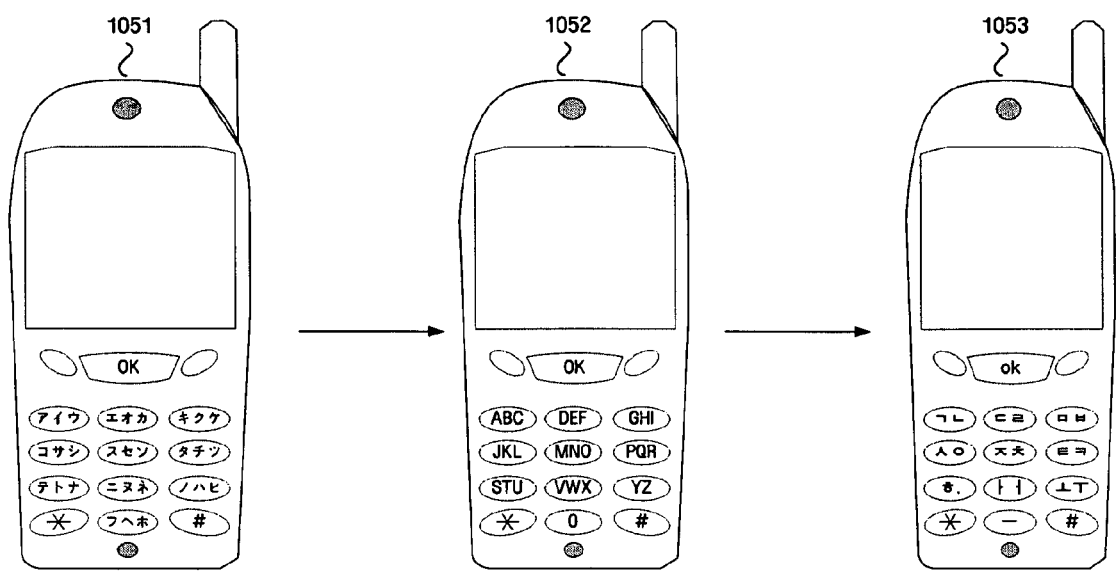
FIG. 12 is a view illustrating an example in which a key is changed according to a network state and a present area according to an exemplary embodiment of the present invention.

FIG. 12 is a view illustrating an example in which a key is changed according to a network state and a present area according to an embodiment of the present invention.

A mobile phone 1051 is provided with a roaming service in Japan. Since the mobile phone 1051 recognizes the local area as Japan, Japanese characters are outputted to the key display unit. In the same manner, if a mobile phone 1052 is taken to the United States, the mobile phone 1052 recognizes the local area as the United States, and English characters are outputted to the key display unit. Also, if a mobile phone 1053 is taken to Korea, the mobile phone 1032 recognizes the local area as Korea, and Korean characters are outputted to the key display unit. The recognition of the local area provided with the roaming service is controlled by a module in the mobile phone in charge of roaming.

Figure 13:
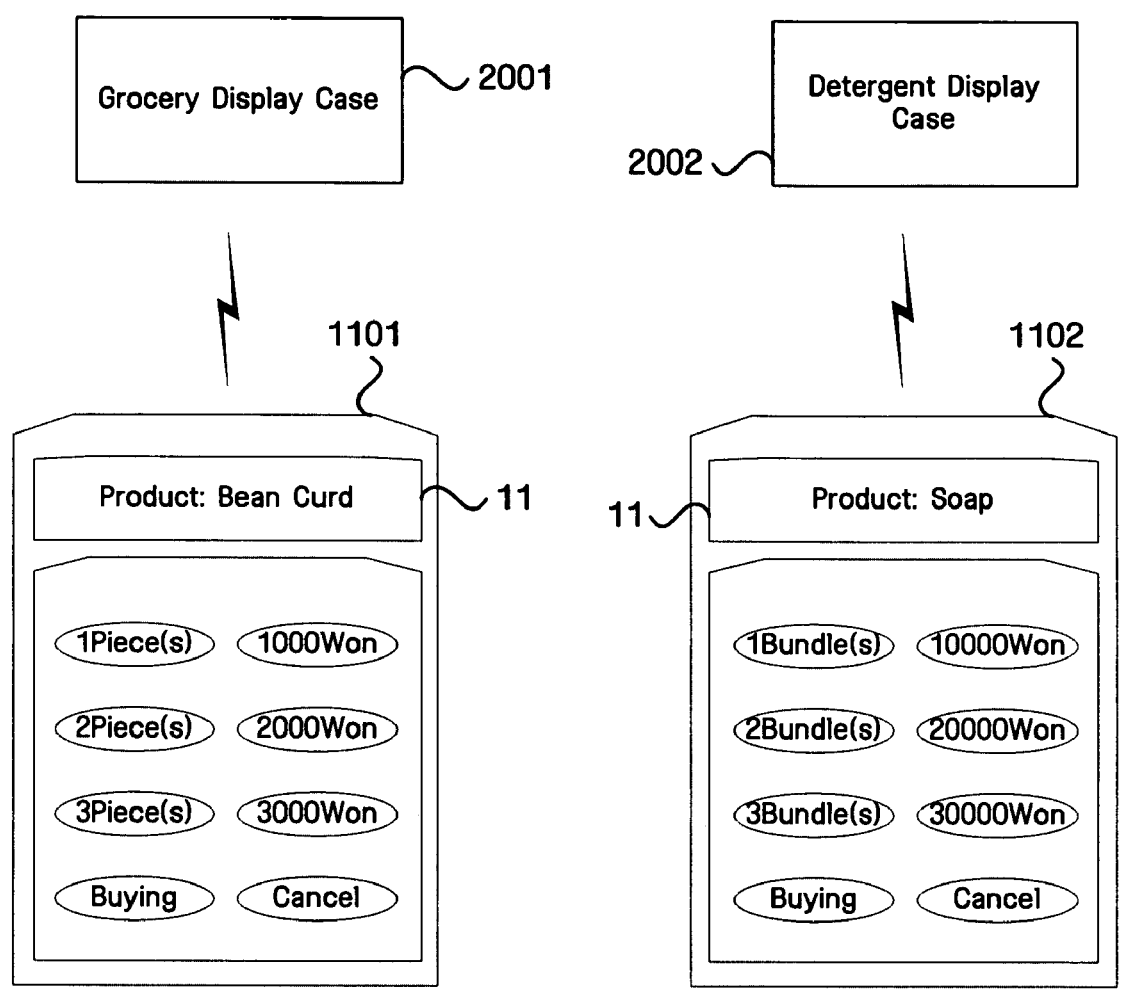
FIG. 13 is a view illustrating an example in which a button of a shopping terminal is changed according to an exemplary embodiment of the present invention.

FIG. 13 is a view illustrating an example in which a button of a shopping terminal is changed according to an exemplary embodiment of the present invention.

If a wireless communication module or RFID mounted on a display case generates a signal in the case where the user moves between display cases when shopping, the buttons of a shopping terminal the user holds are changed to display the items and their prices, as shown in the shopping terminals 1101 and 1102. The keys combined with the key display unit according to the present invention may be mounted to diverse appliances, in addition to the mobile phone. Reference numerals 1101 and 1102 indicate the portable terminals when the user is shopping. When the user moves toward a grocery display case 2001, a wireless communication module or RFID mounted in the grocery display case 2001 generates a signal for reporting the information on the product, and the terminal 1101 receives and outputs the information. For example, a product "bean curd" is displayed on the display unit 11 of the terminal. Quantities and prices of the bean curd are displayed on the key buttons, so that the user can easily view the available quantities and prices and can depress the buttons to purchase a product.

Further, when the user moves toward a detergent display case 2002, a product "soap" is displayed on the display unit 11 of the terminal 1102. Quantities and prices of the soup are displayed on the key buttons, so that the user can easily view the available quantities and prices and can depress the buttons to purchase a product.

Figure 14:
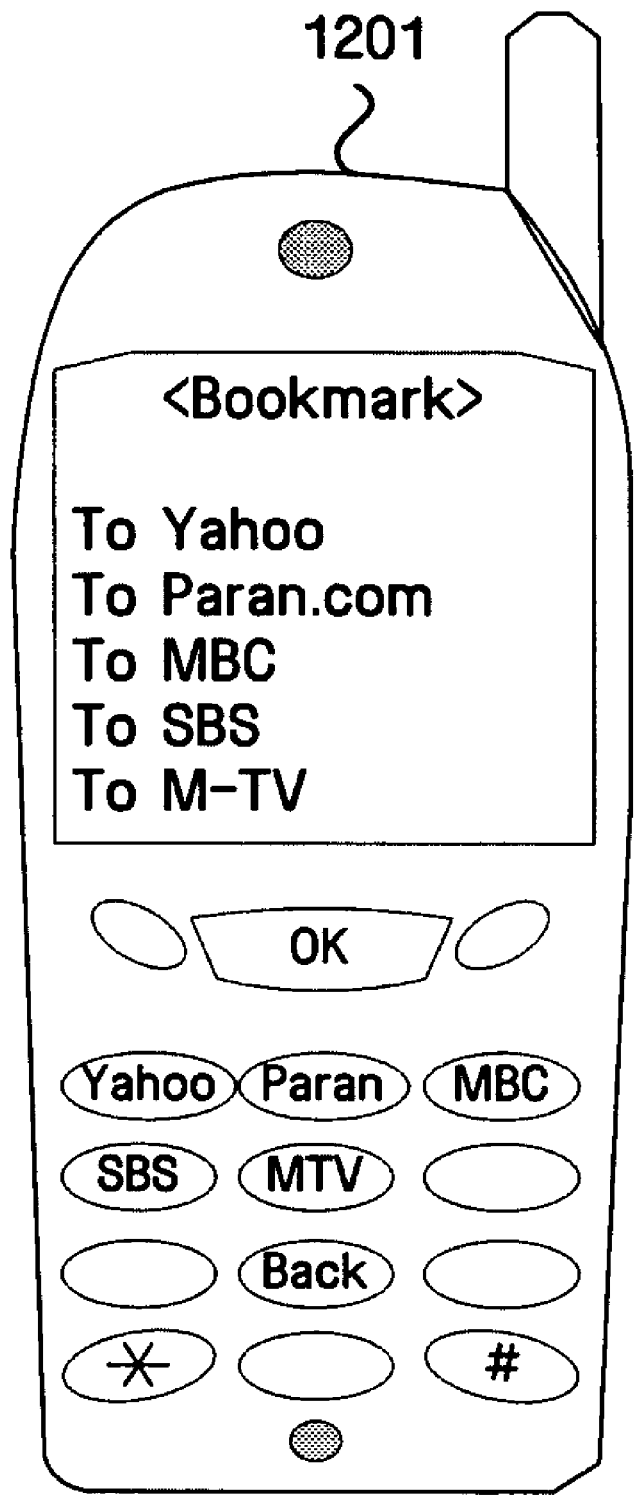
FIG. 14 is a view illustrating an example in which a link is displayed on a key display unit of a mobile phone according to an exemplary embodiment of the present invention.

FIG. 14 is a view illustrating an example in which a link is displayed on the key display unit of the mobile phone according to an exemplary embodiment of the present invention.

The user may access the Internet through a mobile terminal 1201. Recently, mobile terminals have accessed the Internet through a wireless application protocol (WAP). When the user jumps from web page to web page, the mobile terminal accesses the corresponding link by using up, down, right and left direction keys.

Since labels such as "Yahoo", "Paran.com", "MBC", "SBS", and "MTV" are displayed on the display unit of the mobile terminal 1201, the user may depress the corresponding key to visit the desired link. For example, if the user wants to access the Yahoo site, the user depresses the key labelled "Yahoo" to go to the Yahoo site.

Figure 15:
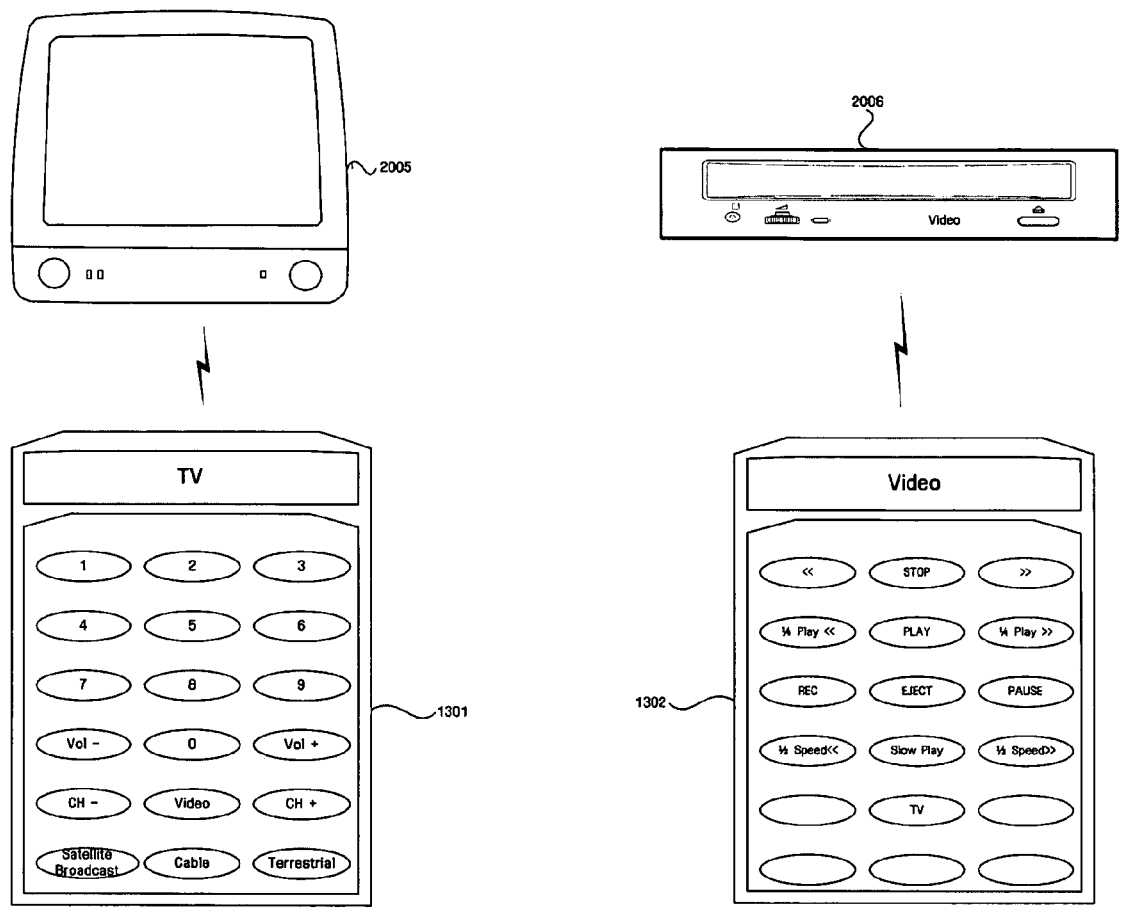
FIG. 15 is a view illustrating an example in which keys of a remote controller display new button images or codes provided by a home appliance according to an exemplary embodiment of the invention.

FIG. 15 is a view illustrating an example in which key buttons of a remote controller represent new button images or codes provided by a home appliance.

In order to control diverse home appliances using one remote controller, the remote controller has been recently provided with various functions. In this case, the number of keys is limited. Accordingly, it is necessary to output the character or image to the key display unit of the remote controller.

The function associated with a TV set 2005 is displayed on a remote controller 1301. For example, channel numbers for tuning to a channel, volume adjustment, channel adjustment, and selection of a satellite broadcast or a cable broadcast may be displayed on the key display unit. It may be set by transferring the characters or images to be displayed on the remoter controller 1301 from the TV set 2005. Further, characters may be represented on the key display unit to control other home appliances such as a video player.

The video player may be controlled by the same remote controller. For example, if a button "video" of the remote controller 1301 is depressed, or if the remote controller 1301 receives new key images and key codes from the video player, the remote controller 1301 is converted into a different remote controller 1302. The remote controller is provided with functions for controlling various playback options such as play, stop, quad-speed search, half-speed search.

The user may use the remote controller diversely through receipt and output of the characters or images to be displayed on the key display unit built in the home appliance.

As described above, according to the present invention, a character or an image displayed on the keys of a mobile device can be freely changed. Thus, the user can select diverse characters or images to be displayed on the keys.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A key input device comprising:
    a key display unit for displaying at least one of a character and an image that identifies a key;
    a touch sensing unit that senses touch according to pressure applied to the key identified by the key display unit; and
    a signal generation unit for generating an electric signal in accordance with the pressure applied to the key;
    wherein the at least one of a character and an image displayed on the key display unit can be changed; and
    further comprising a transparent or translucent protector for reducing the pressure applied to the key display unit to protect the key display unit, and projecting the at least one of a character and an image to be displayed on the key display unit;
    wherein the touch sensing unit is arranged within the transparent or translucent protector.

2. The key input device as claimed in claim 1, further comprising a key map receiving unit for receiving key map information determining the at least one of a character and an image to be displayed on the key.

3. The key input device as claimed in claim 2, wherein if the key input device is combined with a mobile communication device, the key map receiving unit receives a key map from a communication network connected to the mobile communication device.

4. The key input device as claimed in claim 2, wherein if the key input device is combined with a remote controller, the key map receiving unit receives a key map of a home appliance controlled by the remote controller.

5. The key input device as claimed in claim 1, wherein the key display unit displays the at least one of a character and an image for identifying one key, and the touch sensing unit is positioned at an upper or lower end of the key display unit.

6. The key input device as claimed in claim 1, wherein the key display unit displays respective characters or images for a plurality of keys, and the touch sensing unit is positioned at an upper end of the characters or images of the key display unit.

7. The key input device as claimed in claim 1, wherein the touch sensing unit senses the pressure applied through the key display unit.

8. The key input device as claimed in claim 1, wherein the at least one of a character and an image to be displayed on the key display unit corresponds to a moving image.

9. The key input device as claimed in claim 1, wherein if the touch sensing unit is positioned at an upper end of the key display unit, the key display unit comprises material operable to project the at least one of a character and an image to be displayed on the key display unit.

10. The key input device as claimed in claim 1, wherein the key display unit is an organic electro-luminescence (EL) device or an LCD.

11. A digital appliance having a key input device comprising:
   a key display unit for displaying at least one of a character and an image that identifies a key;
   a touch sensing unit that senses pressure applied to the key identified by the key display unit;
   a signal generation unit for generating an electric signal in accordance with the pressure applied to the key; and
   a display control unit for changing the at least one of a character and an image displayed on the key display unit;
   further comprising a transparent or translucent protector for reducing the pressure applied to the key display unit to protect the key display unit, and projecting the character or image to be displayed on the key display unit;
   wherein the touch sensing unit is arranged within the transparent or translucent protector.

12. The digital appliance as claimed in claim 11, further comprising a key map receiving unit for receiving key map information determining the at least one of a character and an image to be displayed on the key.

13. The digital appliance as claimed in claim 12, wherein if the digital appliance is a mobile communication device, the key map receiving unit receives a key map from a communication network combined with the mobile communication device.

14. The digital appliance as claimed in claim 12, wherein if the digital appliance is a remote controller, the key map receiving unit receives a key map of a home appliance controlled by the remote controller.

15. The digital appliance as claimed in claim 11, wherein the display control unit controls the key display unit to output the at least one of a character and an image that is received from an external source and stored.

16. The digital appliance as claimed in claim 11, wherein if the signal generation unit reports contact of the touch sensing unit, the display control unit activates or inactivate s a function for displaying the at least one of a character and an image outputted from the key display unit.

17. The digital appliance as claimed in claim 11, wherein the key display unit displays the at least one of a character and an image for identifying one key, and the touch sensing unit is positioned at an upper or lower end of the key display unit.

18. The digital appliance as claimed in claim 11, wherein the key display unit displays respective characters or images for a plurality of keys, and the touch sensing unit is positioned at an upper end of the characters or images of the key display unit.

19. The digital appliance as claimed in claim 11, wherein the touch sensing unit senses the pressure applied through the key display unit.

20. The digital appliance as claimed in claim 11, wherein the at least one of a character and an image to be displayed on the key display unit corresponds to a moving image.

21. The digital appliance as claimed in claim 11, wherein if the touch sensing unit is positioned at an upper end of the key display unit, the key display unit is made of a material capable of projecting the at least one of a character and an image to be displayed on the key display unit.

22. The digital appliance as claimed in claim 11, wherein the key display unit is made of an organic electro-luminescence (EL) device or an LCD.

* * * * *